United States Patent [19]
Knee et al.

[11] Patent Number: 5,994,710
[45] Date of Patent: Nov. 30, 1999

[54] SCANNING MOUSE FOR A COMPUTER SYSTEM

[75] Inventors: Derek L. Knee; Bradley K. Davis, both of Ft. Collins, Colo.

[73] Assignee: Hewlett-Packard Company, Palo Alto, Calif.

[21] Appl. No.: 09/070,189

[22] Filed: Apr. 30, 1998

[51] Int. Cl.$^6$ .................................................. G06K 11/18
[52] U.S. Cl. ...................... 250/557; 250/208.1; 250/234; 250/559.44; 345/158; 345/163; 382/313
[58] Field of Search ............................. 250/208.1, 208.2, 250/556, 557, 221, 222.1, 237 R, 239, 559.4, 559.44, 559.29, 559.37; 345/156, 157, 158, 163, 164, 165, 166; 382/312, 313, 314, 315, 316, 321, 322, 323, 324; 358/473; 341/5, 6, 13, 31

[56] References Cited

U.S. PATENT DOCUMENTS

| | | | |
|---|---|---|---|
| 4,546,347 | 10/1985 | Kirsch | 250/237 R |
| 4,751,380 | 6/1988 | Victor et al. | 250/221 |
| 4,794,384 | 12/1988 | Jackson | 345/166 |
| 4,797,544 | 1/1989 | Montgomery et al. | 250/221 |
| 4,799,055 | 1/1989 | Nestler et al. | 250/221 |
| 4,920,260 | 4/1990 | Victor et al. | 250/221 |
| 5,355,146 | 10/1994 | Chiu et al. | 345/156 |
| 5,497,150 | 3/1996 | Kimura et al. | 358/473 |
| 5,578,813 | 11/1996 | Allen et al. | 250/208.1 |
| 5,644,139 | 7/1997 | Allen et al. | 250/557 |
| 5,729,009 | 3/1998 | Dändliker et al. | 250/208.2 |
| 5,786,804 | 7/1998 | Gordon | 345/158 |
| 5,825,044 | 10/1998 | Allen et al. | 250/557 |

*Primary Examiner*—John R Lee
*Attorney, Agent, or Firm*—Edward L. Miller

[57] ABSTRACT

A scanning mouse has two optical navigation sensors to allow measurement of both translation and rotation of the scanning mouse. It also has an image sensor, and the ability to digitize the sensed image data. There may be a second image sensor at perpendicular to the first. A high speed digital data path connects the scanning mouse to the computer. Software in the computer processes image line data that includes the locations of the navigation sensors and the digitized image data to produce partial scanned images that are further assembled into a complete image within the environment of the computer. Each optical navigation sensor images as an array of pixels the spatial features of generally any micro textured or micro detailed work surface below the mouse. The photo detector responses are digitized and stored as a frame into memory. Motion produces successive frames of translated patterns of pixel information, which are compared by autocorrelation to ascertain the direction and amount of movement. A hold feature suspends the production of movement signals to the computer.

5 Claims, 6 Drawing Sheets

SCANNING MOUSE FOR A COMPUTER SYSTEM

REFERENCE TO RELATED PATENTS

This Application is related to the subject matter described in the following two U.S. Patents: U.S. Pat. No. 5,578,813 filed Mar. 2, 1995, issued Nov. 26, 1996 and entitled FREEHAND IMAGE SCANNING DEVICE WHICH COMPENSATES FOR NON-LINEAR MOVEMENT; and U.S. Pat. No. 5,644,139, filed Aug. 14, 1996, issued Jul. 1, 1997 and entitled NAVIGATION FOR DETECTING MOVEMENT OF NAVIGATION SENSORS RELATIVE TO AN OBJECT. Both of these Patents have the same inventors: Ross R. Allen, David Beard, Mark T. Smith and Barclay J. Tullis, and both Patents are assigned to Hewlett-Packard Co. This application is also related to the subject matter described in U.S. Pat. No. 5,786,804, filed Oct. 6, 1995, issued Jul. 28, 1998 and entitled METHOD AND SYSTEM FOR TRACKING ATTITUDE, and also assigned to Hewlett-Packard Co. These three Patents describe techniques for the tracking of position movement and for the assembly of scanned portions of a document into an entire document. Those techniques are a component in the preferred embodiment described below. Accordingly, U.S. Pat. Nos. 5,578,813, 5,644,139 and 5,786,804 are hereby incorporated herein by reference.

BACKGROUND OF THE INVENTION

The use of a hand operated pointing device for use with a computer and its display has become almost universal. By far the most popular of the various devices is the conventional (mechanical) mouse, used in conjunction with a cooperating mouse pad. Centrally located within the bottom surface of the mouse is a hole through which a portion of the underside of a rubber-surfaced steel ball extends. The mouse pad is typically a closed cell foam rubber pad covered with a suitable fabric. Low friction pads on the bottom surface slide easily over the fabric, but the rubber ball does not skid, but instead rolls as the mouse is moved. Interior to the mouse are rollers, or wheels, that contact the ball at its equator and convert its rotation into electrical signals representing orthogonal components of mouse motion. These electrical signals are coupled to the computer, where software responds to the signals to change by a $\Delta x$ and a $\Delta y$ the displayed position of a pointer (cursor) in accordance with movement of the mouse. The user moves the mouse as necessary to get the displayed pointer into a desired location or position. Once the pointer on the screen points at an object or location of interest, one of one or more buttons on the mouse is activated with the fingers of the hand holding the mouse. The activation serves as an instruction to take some action, the nature of which is defined by the software in the computer.

Unfortunately, the usual sort of mouse described above is subject to a number of shortcomings. Among these are deterioration of the mouse ball or damage to its surface, deterioration or damage to the surface of the mouse pad, and degradation of the ease of rotation for the contact rollers (say, (a) owing to the accumulation of dirt or of lint, or (b) because of wear, or (c) both (a) and (b)). All of these things can contribute to erratic or total failure of the mouse to perform as needed.

The underlying reason for all this trouble is that the conventional mouse is largely mechanical in its construction and operation, and relies to a significant degree on a fairly delicate compromise about how mechanical forces are developed and transferred.

Over the years, a number of optical techniques have been proposed for a computer mouse, but to date the mechanical mouse remains the most widely used pointing device. One recent optical development that appears likely to gain a significant degree of acceptance is that described in U.S. patent application Ser. No. 09/052,046, entitled SEEING EYE MOUSE FOR A COMPUTER SYSTEM, filed Mar. 30, 1998, by Gordon, Knee, Badyal and Hartlove and assigned to Hewlett-Packard Co. That Application discloses the use of techniques described in the aforementioned incorporated Patents to produce an optical mouse that navigates upon an arbitrary surface. The device disclosed therein is a non-mechanical mouse that is viable from a manufacturing perspective, relatively inexpensive, reliable, and appears to the user as essentially the operational equivalent of the conventional mouse. This new type of optical mouse has a familiar "feel" and is free of unexpected behaviors. It does not rely upon cooperation with a mouse pad, whether special or otherwise, but is instead able to navigate upon almost any arbitrary surface. It uses a single imaging integrated circuit to track translation of that circuit (and by implication, the mouse itself) across the arbitrary surface.

Freely movable scanners are self contained appliances that are moved across a document surface. The simplest of these devices simply produce a strip of paper bearing a facsimile of the scanned material. More sophisticated devices create a raster representation in a memory and whose data may be transferred to a computer through a custom interface. That data might include several passes over a document (say, overlapping parallel left to right passes from top to bottom of page) whose associated raster images are subsequently assembled into a pixel by pixel representation of the entire document by stitching software within the computer. These classes of device all assume motion in one direction and scanning [either with charge coupled devices (CCD's) or contact image sensors (CIS's)] in a direction perpendicular to that motion. This is often enforced mechanically by a device-wide roller placed parallel to the image sensor, and whose purpose is to prevent a twisting or yawing motion of the device as it is moved across the document. Rotation of the roller indicates displacement, and is taken as a definition of the aforementioned motion in one direction.

A more sophisticated hand held scanner is disclosed by the incorporated Patents. A navigation mechanism is disposed at each end of an image sensor. The user is allowed to move the scanner over the document in any manner deemed suitable, even scanning the same material multiple times from the same or different directions. This becomes possible because the data produced from each scanning operation can now be processed to compensate for arbitrary scanner motion and permit finding a value for each element in the pixel grid associated with the final representation of the document or image. The hand held scanner disclosed by the incorporated Patents internally performs such processing, including the stitching of image segments together to produce a complete image. A small view screen on the scanner allows the user to see a low resolution approximation of the result, so that missed areas can be re-scanned before the scanner is removed from the document. A complete scanned image is transferred to a using environment, (e.g., a computer) at a later time through an appropriate interface.

Although the disclosed freely movable hand held scanner with two navigation sensors works quite well, it is nevertheless not ideally matched to certain environments. It is perhaps best suited for use in out-of-the-office settings where a stand alone scanner is the only scanner practical.

Internally, that scanner has an impressive amount of processing power and memory, not to mention a large battery.

People often have computers at their desks, and many also have a use for a scanning capability. A conventional flat bed scanner takes up extra space, and a compact type that accepts a roller fed document cannot scan things that are not a separate individual sheet of paper. The high quality and error corrected result of the freely moveable hand held scanner is desirable, but the small viewing screen, significant price and bothersome data transfer operation are discouraging factors. It would be desirable if any document could be quickly scanned into the computer without undue fuss or expense, and without expending the desktop space needed by a flat bed scanner.

SUMMARY OF THE INVENTION

A solution to the problem of low cost convenient scanning is replacing a conventional mechanical mouse with an optical counterpart augmented to also scan documents. The augmentation includes equipping the mouse with a second navigation mechanism so that rotation of the mouse can be detected and compensated for, with an image sensor and with a mechanism for transmitting digital image data to software in the computer that processes that data for display and other uses.

For example, imagine if you will that a user is engaged in normal computer activities with a mouse pointer, when the need to digitize some document arises. He has an optical scanning mouse that does not need a mouse pad; that portion of his desktop that would otherwise have a mouse pad is simply open, save for the mouse. He picks up the mouse, lays the document face up on the desk and replaces the mouse (for simplicity, assume that it is placed in the center of the document). Let's say it is a three button mouse. He presses the center (#3) button and Presto! The screen switches to a blank graphics display. As he moves the mouse over the document the scanned portions are displayed. Any adjustable parameters and needed commands are available on pop-up menus that appear when button #2 (right button of a right-handed configuration) is pressed. Moving the mouse with button #2 pressed provisionally selects different items in the menu. A selected choice is acted upon by releasing button #2. Pressing button #1 (left button of a right-handed configuration) retains the graphics display, suspends scanning and produces a mouse pointer that may be used to select items or regions visible in the display. Double clicking with button #1, or selecting an associated menu choice, suspends tracking with the mouse pointer and resumes scanning. When the scanned image is satisfactory, some appropriate action is selected with the button #2 menu mechanism, say, storing the image in a file. After that, pressing button #3 again, or double clicking it, or perhaps making an explicit menu choice, ends the scanning mode and the regular screen prior to scanning is restored. The scanning mode might be automatically cleared each time it is entered, or it might retain results to date, allowing the user to leave it and later return to it and continue, assuming, of course, that the scanning mouse has not been picked up (so that it still knows where it is and can resume correct interaction with the image processing software). In either case, a graphics clear command could be one of the menu choices.

It will be appreciated that the scanning mouse does not send a completed rasterized image to the computer. Instead, it sends arbitrarily oriented image lines that may be described in a functional or logical sense as: (1) a "starting point," which conceptually represents one end of the image sensor; (2) 64, 128, 256 or 512, etc., triples of digitized pixel values for the Red, Green and Blue (RGB) components for the pixel positions along the image sensor; and, (3) an "ending point," which conceptually represents the other end of the image sensor. We say "conceptually," since it will be readily understood that there is no need for the navigation sensors that produce the corresponding data to actually be either: (a) in a line along the principal axis of the image sensor; or, (b) even near its ends. The navigation sensors provide information about mouse translation and rotation as between successive image lines. This implies that all image lines are based upon, or are in some sense relative to, the first image line for a scanning session. This is so, and is in accordance with the fact that the mouse is not an absolute positioning device; it is a relative motion device. It is the known fixed spatial relationship between the two navigation sensors and the image sensor, and the reported change in their values between consecutive image lines that allows the reassembly of the individually scanned portions of the overall document or image.

If the scanning of documents is done to 300 DPI (Dots Per Inch) then the navigation sensors must navigate to at least 9000 DPI (yes, that's nine thousand!), if not more. The stitching (reassembly) software cannot assemble 300 DPI segments using 300 DPI position information. Accordingly, we prefer that the navigation sensors each have photo sensor arrays that are 48×48 sensors. This allows extensive interpolation of image movement and pixel position.

Another consideration arises when the navigation sensors are equipped with arrays of 48×48 sensors. That is that the navigation sensors provide position information with far more resolution than is produced by the image sensor(s). Accordingly, it is desirable to examine the position data to see if the scanning mouse has actually moved enough for the image sensors to see a different part of the document. This means that, just because there was some movement indicated by the navigation sensors, there will not necessarily be a corresponding image line transmitted to the computer. The determination to send a new image line may be made internal to the scanning mouse itself, or in the stitching software and the result relayed to the scanning mouse.

The receiving software in the computer may make the initial assumption that the starting position of the scanning mouse is such that its longest axis (corresponding to palm to finger tips when gripped with the user's hand) is the Y axis of the document. If this is not correct, or if the image is produced tipped relative to the edges of the screen, it can be corrected for by use of the menus.

The image sensor might be a gray-scale device instead of color, in which case the image line would consist of single pixel values between the "starting point" and "ending point."

It will also be appreciated that sending digital data is preferred to sending analog signal values and then subsequently digitizing them in the computer. This implies that the scanning mouse should be connected to the computer with a fairly high bandwidth signal path (say, five to ten megabits per second); e.g. the universal serial bus or perhaps with an optical fiber.

DESCRIPTION OF A PREFERRED EMBODIMENT

Navigation

Figure 1:
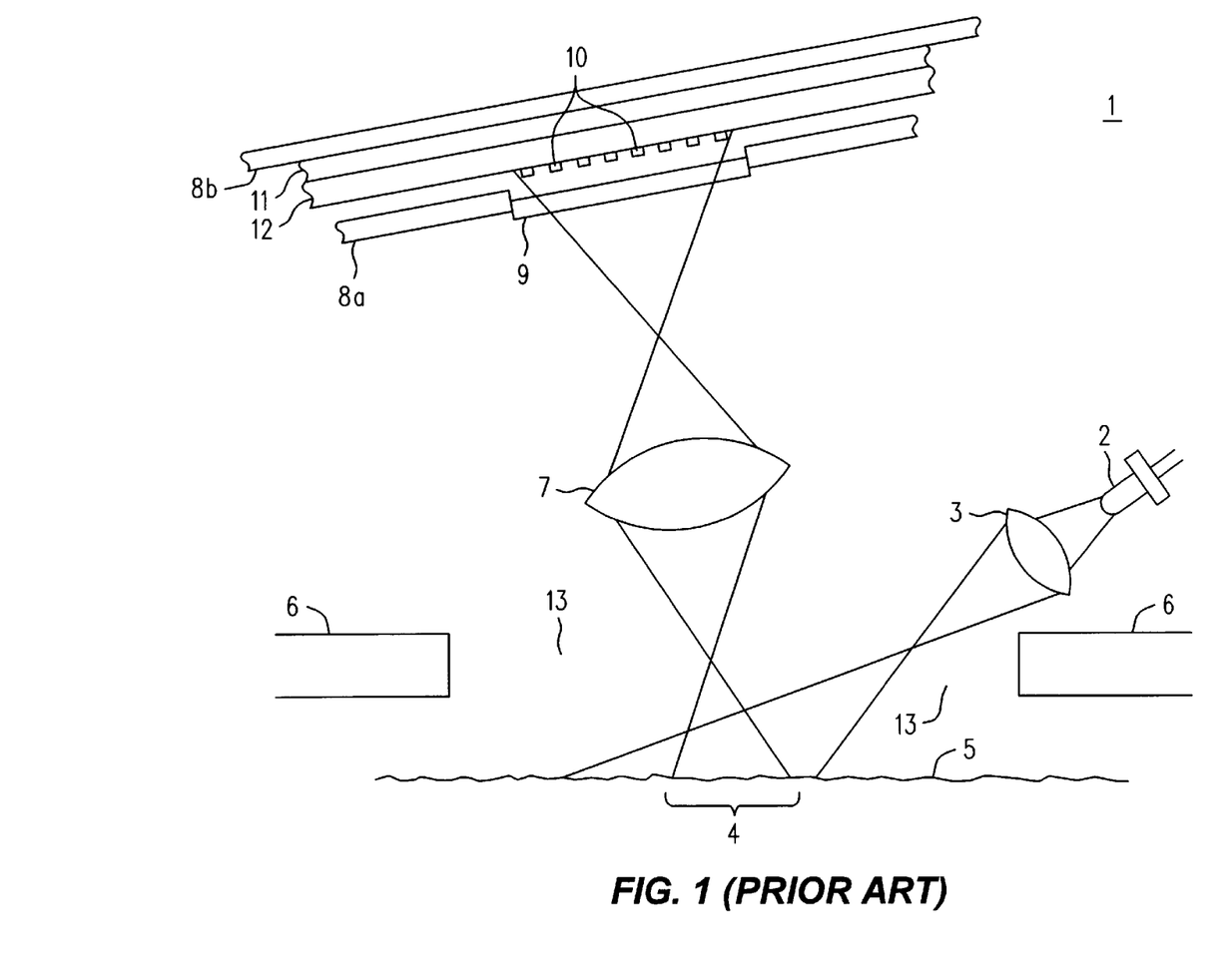
FIG. 1 is a simplified pictographic cut-away side view of a prior art imaging and navigation arrangement.

Refer now to FIG. 1, wherein is shown a simplified representation of a cut-away side view of a prior art imaging and navigation arrangement 1 that is generally of the type described by the incorporated Patents. The scanning mouse of the present invention will incorporate two navigation mechanisms, which are preferably the same as or similar to navigation arrangement 1. Even though the Patents have been incorporated, as a convenience to the reader we now briefly describe that navigation arrangement 1.

An LED 2, which may be an IR LED, emits light which is projected by lens 3 (which instead of being separate may be an integral part of the LED's package), through orifice 13 in bottom surface 6 and onto a region 4 that is part of a work surface 5. The average angle of incidence is preferably within the range of five to twenty degrees. Although it has been omitted for clarity, the orifice 13 might include a window that is transparent for the light from LED 2, and which would serve to keep dust, dirt or other contamination out of the innards of the scanning mouse. Work surface 5 might belong to a special object, such as a mouse pad, or more generally, it will not, and might be the surface of nearly anything except smooth glass. Examples of suitable materials include, but are not limited to, paper, cloth, laminated plastic tops, painted surfaces, frosted glass (smooth side down, thank you), desk pads, real wood, fake wood, etc. Generally, any micro textured surface having features whose size falls within the range of 5 to 500 microns will do.

The illumination of micro textured surfaces is most effective when done from the side, as this accentuates the pattern of highlights and shadows produced by surface height irregularities. Suitable angles of incidence for illumination cover the range of about five to twenty degrees. A very smooth or flat surface (e.g., one that has been ground and polished) having simple variations in reflectivity owing to (micro scale) compositional variation works, too. In such a case (and assuming that it can be guaranteed) the angle of incidence for the illumination could approach ninety degrees, since the urge to create shadows goes away. However, such a smooth yet micro detailed surface is not what we would ordinarily think of when we say "arbitrary surface", and a scanning mouse intended for use on an "arbitrary surface" that is more likely micro textured would work best if equipped to provide a grazing angle of incident illumination.

An image of the illuminated region 4 is projected through an optical window 9 in package portion 8a of an integrated circuit and onto an array 10 of photo detectors. This is done with the aid of lens 7. The package portion 8a might also dispense with separate window 9 and lens 7 by combining them into one and the same element. The photo detectors may comprise a square array of, say, 48 detectors on a side, each detector being a photo transistor whose photo sensitive region is 45 by 45 microns and of 60 microns center to center spacing. The photo transistors charge capacitors whose voltages are subsequently digitized and stored in a memory. The array 10 is fabricated onto a portion of an integrated circuit die 12 affixed by an adhesive 11 onto package portion 8b. What is not shown are any of the details of how the integrated circuit is held in place (probably by a printed circuit board), the shape or composition of the lenses, or of how the lenses are mounted; it is clear that those things are doable in a conventional manner. It is also clear that the general level of illumination of region 4 may be controlled by noticing the output levels of the photo detectors and adjusting the intensity of light issuing from the LED 2. This could be either continuous control or pulse width modulation, or some combination of both.

The preferred optical navigation optically detects motion by directly imaging as an array of pixels the various particular spatial features of a document or arbitrary work surface below the mouse, much as human vision is believed to do. To this end the document or work surface below the imaging mechanism is illuminated from the side, say, with an infrared (IR) light emitting diode (LED). A surprisingly wide variety of surfaces create a rich collection of highlights and shadows when illuminated with a suitable angle of incidence. That angle is generally low, say, on the order of five to twenty degrees, and we shall term it a "grazing" angle of incidence. Paper, with its fiber content, is usually easily navigated upon (some coated stocks are bereft of micro features). Wood, formica and painted surfaces all work well for navigation; about the only surface that does not work is smooth glass (unless it is covered with fingerprints!).The reason these surfaces work is that they possess a micro texture, which in some cases may not be perceived by the unaided human senses.

For each navigation sensor, IR light reflected from the micro textured surface is focused onto a suitable array (say, 48×48) of photo detectors. The LED may be continuously on with either a steady or variable amount of illumination servoed to maximize some aspect of performance (e.g., the dynamic range of the photo detectors in conjunction with the albedo of the work surface). Alternatively, a charge accumulation mechanism coupled to the photo detectors may be "shuttered" (by current shunting switches) and the LED pulsed on and off to control the exposure by servoing the average amount of light. Turning the LED off also saves power; an important consideration in battery operated environments. The responses of the individual photo detectors are digitized to a suitable resolution (say, six or eight bits) and stored as a frame into corresponding locations within an array of memory.

Preferably, the size of the image projected onto the photo detectors is a slight magnification of the original features being imaged, say, by two to four times. However, if the photo detectors are small enough it may be possible and desirable to dispense with magnification. The size of the photo detectors and their spacing is such that there is much more likely to be one or several adjacent photo detectors per image feature, rather than the other way around. Thus, the pixel size represented by the individual photo detectors corresponds to a spatial region on the work surface of a size that is generally smaller than the size of a typical spatial feature on that work surface, which might be a strand of fiber in a cloth covering a mouse pad, a fiber in a piece of paper or cardboard, a microscopic variation in a painted surface, or an element of an embossed micro texture on a plastic laminate. The overall size of the array of photo detectors is preferably large enough to receive the images of several features. In this way, images of such spatial features produce translated patterns of pixel information as the mouse moves. The number of photo detectors in the array and the frame rate at which their contents are digitized and captured cooperate to influence how fast the seeing-eye mouse can be moved over the work surface and still be tracked. Tracking is accomplished by comparing a newly captured sample frame with a previously captured reference frame to ascertain the direction and amount of movement. One way that may be done is to shift the entire content of one of the frames by a distance of one pixel (corresponds to a photo detector), successively in each of the eight directions allowed by a one pixel offset trial shift (one over, one over and one down, one down, one up, one up and one over, one over in the other direction, etc.). That adds up to eight trials, but we mustn't forget that there might not have been any motion, so a ninth trial "null shift" is also required. After each trial shift those portions of the frames that overlap each other are subtracted on a pixel by pixel basis, and the resulting differences are (preferably squared and then) summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames. That is, it provides raw movement information which may be scaled and or accumulated to provide display pointer movement information ($\Delta x$ and $\Delta y$) of a convenient granularity and at a suitable rate of information exchange.

The actual algorithms described in the incorporated Patents (and used by the scanning mouse) are refined and sophisticated versions of those described above. For example, let us say that the photo detectors were a 48×48 array. We could say that we initially take a reference frame by storing the digitized values of the photo detector outputs as they appear at some time to. At some later time $t_1$ we take a sample frame and store another set of digitized values. We wish to correlate a new collection of nine comparison frames (thought to be, null, one over, one over and one up, etc.) against a version of the reference frame representing "where we were last time". The comparison frames are temporarily shifted versions of the sample frame; note that when shifted a comparison frame will no longer overlap the reference frame exactly. One edge, or two adjacent edges will be unmatched, as it were. Pixel locations along the unmatched edges will not contribute to the corresponding correlation (i.e., for that particular shift), but all the others will. And those others are a substantial number of pixels, which gives rise to a very good signal to noise ratio. For "nearest neighbor" operation (i.e., limited to null, one over, one up/down, and the combinations thereof) the correlation produces nine "correlation values", which may be derived from a summing of squared differences for all pixel locations having spatial correspondence (i.e., a pixel location in one frame that is indeed paired with a pixel location in the other frame unmatched edges won't have such pairing).

A brief note is perhaps in order about how the shifting is done and the correlation values obtained. The shifting is accomplished by using address offsets for memories that can output an entire row or column of an array at one time. Dedicated arithmetic circuitry is connected to the memory array that contains the reference frame being shifted and to the memory array that contains the sample frame. The formulation of the correlation value for a particular trial shift (member of the nearest or near neighbor collection) is accomplished very quickly. The best mechanical analogy is to imagine a transparent (reference) film of clear and dark patterns arranged as if it were a checker board, except that the arrangement is perhaps random. Now imagine that a second (sample) film having the same general pattern is overlaid upon the first, except that it is the negative image (dark and clear are interchanged). Now the pair is aligned and held up to the light. As the reference film is moved relative to the sample film the amount of light admitted through the combination will vary according to the degree that the images coincide. The positioning that admits the least light is the best correlation. If the negative image pattern of the reference film is a square or two displaced from the image of the sample film, the positioning admits the least light will be one that matches that displacement. We take note of which displacement admits the least light; for the scanning mouse we notice the positioning with the best correlation and say that the mouse moved that much. That, in effect, is what happens within an integrated circuit (IC) having photo detectors, memory and arithmetic circuits arranged to implement the image correlation and tracking technique we are describing.

It would be desirable if a given reference frame could be re-used with successive sample frames. At the same time, each new collection of nine (or twenty-five) correlation values (for collections at $t_i$, $t_{i+1}$, etc.) that originates from a new image at the photo detectors (a next sample frame) should contain a satisfactory correlation. For a hand held mouse, several successive collections of comparison frames can usually be obtained from the (48×48) reference frame taken at to. What allows this to be done is maintaining direction and displacement data for the most recent motion (which is equivalent to knowing velocity and time interval since the previous measurement). This allows "prediction" of how to (permanently!) shift the collection of pixels in the reference frame so that for the next sample frame a "nearest neighbor" can be expected to correlate. This shifting to accommodate prediction throws away, or removes, some of the reference frame, reducing the size of the reference frame and degrading the statistical quality of the correlations. When an edge of the shifted and reduced reference frame begins to approach the center of what was the original reference frame it is time to take a new reference frame. This manner of operation is termed "prediction". The benefits of prediction are a speeding up of the tracking process by streamlining internal correlation procedure (avoiding the comparison of two arbitrarily related 48×48 arrays of data) and a reduction of the percentage of time devoted to acquiring reference frames.

Our scanning mouse may have a "hold" function that suspends the production of movement signals to the computer, allowing the mouse to be physically relocated on the work surface without disturbing the position on the screen of the pointer. This may be needed if the operator runs out of room to physically move the mouse further, but the screen pointer still needs to go further. The usual maneuver executed by the operator for, say, an extended rightward excursion, is to simply pick the mouse up at the right side of the work surface (a mouse pad, or perhaps simply the edge of clearing on an otherwise cluttered surface of his desk), set it down on the left and continue to move it to the right. What is needed is a way to keep the motion indicating signals from undergoing spurious behavior during this maneuver, so that the pointer on the screen behaves in an expected and non-obnoxious manner. The "hold" function may be performed automatically by a proximity sensor on the underside of the mouse that determines that the mouse is not in contact with the work surface, or by noticing that all or a majority of the pixels in the image have "gone dark" (it's actually somewhat more complicated than that, as explained below).

What happens, of course, is that the IR light from the illuminating LED no longer reaches the photo detectors in the same quantity that it did, if at all; the reflecting surface is too far away or is simply not in view. However, if the scanning mouse were turned over, or its underside exposed to an intensely lit environment as a result of its being lifted, then the outputs of the photo detectors might be at any level. The key is that they will be uniform, or nearly so. The main reason that they become uniform is that there is no longer a focused image; all the image features are indistinct and they are each spread out over the entire collection of photo detectors. So the photo detectors uniformly come to some average level. This is in distinct contrast with the case when there is a focused image. In the focused case the correlations between frames (recall the one over, one over and one down, etc.) exhibit a distinct phenomenon.

Assume that the spatial features being tracked mapped exactly onto the photo detectors, through the lens system, and that mouse movement were jerky by exactly the amount and in the directions needed for a feature to go from detector to detector. Now for simplicity assume also that there is only one feature, and that its image is the size of a photo detector. So, all the photo detectors but one are all at pretty much the same level, and the one detector that is not at that level is at a substantially different level, owing to the feature. Under these highly idealized conditions it is clear that the correlations will be very well behaved; eight "large" differences and one small difference (a sink hole in an otherwise fairly flat surface) in a system using nine trials for a nearest neighbor algorithm (and remembering that there may have been no motion). Note: The astute reader will notice that the "large" difference in this rather contrived example actually corresponds to, or originates with, only one pixel, and probably does not deserve to be called "large"—recall the earlier shifted film analogy. The only light passed by the films for this example would be for the one pixel of the feature. A more normal image having a considerably more diverse collection of pixels increases the difference to where it truly is a "large" difference.

Now, such highly idealized conditions are not the usual case. It is more normal for the image of the tracked spatial features to be both larger and smaller than the size of the photo detectors, and for the mouse motion to be continuous, following a path that allows those images to fall onto more than one detector at once. Some of the detectors will receive only a partial image, which is to say, some detectors will perform an analog addition of both light and dark. The result is at least a "broadening" of the sink hole (in terms of the number of photo detectors associated with it) and very possibly a corresponding decrease in the depth of the sink hole. The situation may be suggested by imagining a heavy ball rolling along a taut but very stretchable membrane. The membrane has a discrete integer Cartesian coordinate system associated with it. How much does the membrane distend at any integer coordinate location as the ball rolls? First imagine that the ball is of a very small diameter but very heavy, and then imagine that the ball is of a large diameter, but still weighs the same. The analogy may not be exact, but it serves to illustrate the idea of the "sink hole" mentioned above. The general case is that the generally flat surface with sharply defined sink hole becomes a broad concavity, or bowl.

We shall term the surface produced or described by the various correlation values the "correlation surface."

We say all of this to make two points. First, the shifting shape of the concavity in the correlation surface as the scanning mouse moves allows interpolation to a granularity finer than the simple size/spacing of the photo detectors. We point this out, with the remark that our scanning mouse can do that, that the stitching or image segment reassembly algorithms need that extra resolution, and leave it at that. The full details of interpolation and stitching are described in the incorporated Patents. No further discussion of interpolation or stitching is believed necessary. The second point is the observation that what happens when the scanning mouse is picked up is that the concavity in the correlation surface goes away, to be replaced by generally equal values for the correlations (i.e., a "flat" correlation surface). It is when this happens that we may say with considerable assurance that the scanning mouse is air borne, and can then automatically invoke the hold feature, until after such time that a suitable concavity ("bowl") reappears.

Image Sensing

The prior art contains at least two image sensing techniques that are applicable to the scanning mouse to be described. These are Charge Coupled Devices (CCD's) and Contact Image Sensors (CIS's). We prefer to use the CIS variety. These are typically linear arrays of phototransistors or photodiodes with associated charge amplifier circuitry for each photo sensing element. Charge is allowed to accumulate for a selected length of time, after which the amount of charge for each pixel is sampled, on after the other. Most CIS's have an internal "one of n-line" selection mechanism that sequentially places each pixel output onto a common analog output bus in response to a supplied clock signal and a start signal. It is common for the analog bus and the control signals to be arranged so that parts can be easily ganged to extend the effective length of the CIS without having a corresponding increase in the number of control signals that need individual attention.

Each newly clocked out analog value is then digitized, say, to eight bits of precision. The resulting sequence of bytes is then taken as the image data that is to be processed by whatever application is in use. A monochromatic gray-scale CIS simply has one color of illumination, which is provided near the pixels to be sensed and under a light excluding shroud that blocks ambient light. For a color CIS the document is sequentially illuminated by three different colored LED's. The three different results are digitized to produce RGB triples that represent a color image of the document.

More information about a recent color CIS developed by Mitsubishi Electric Corporation of Japan may be found at pages 146–153 of volume 3019 (1997) of Proceedings of SPIE, box 10, Bellingham, Wash., 98227.

The Combination

Figure 2A:
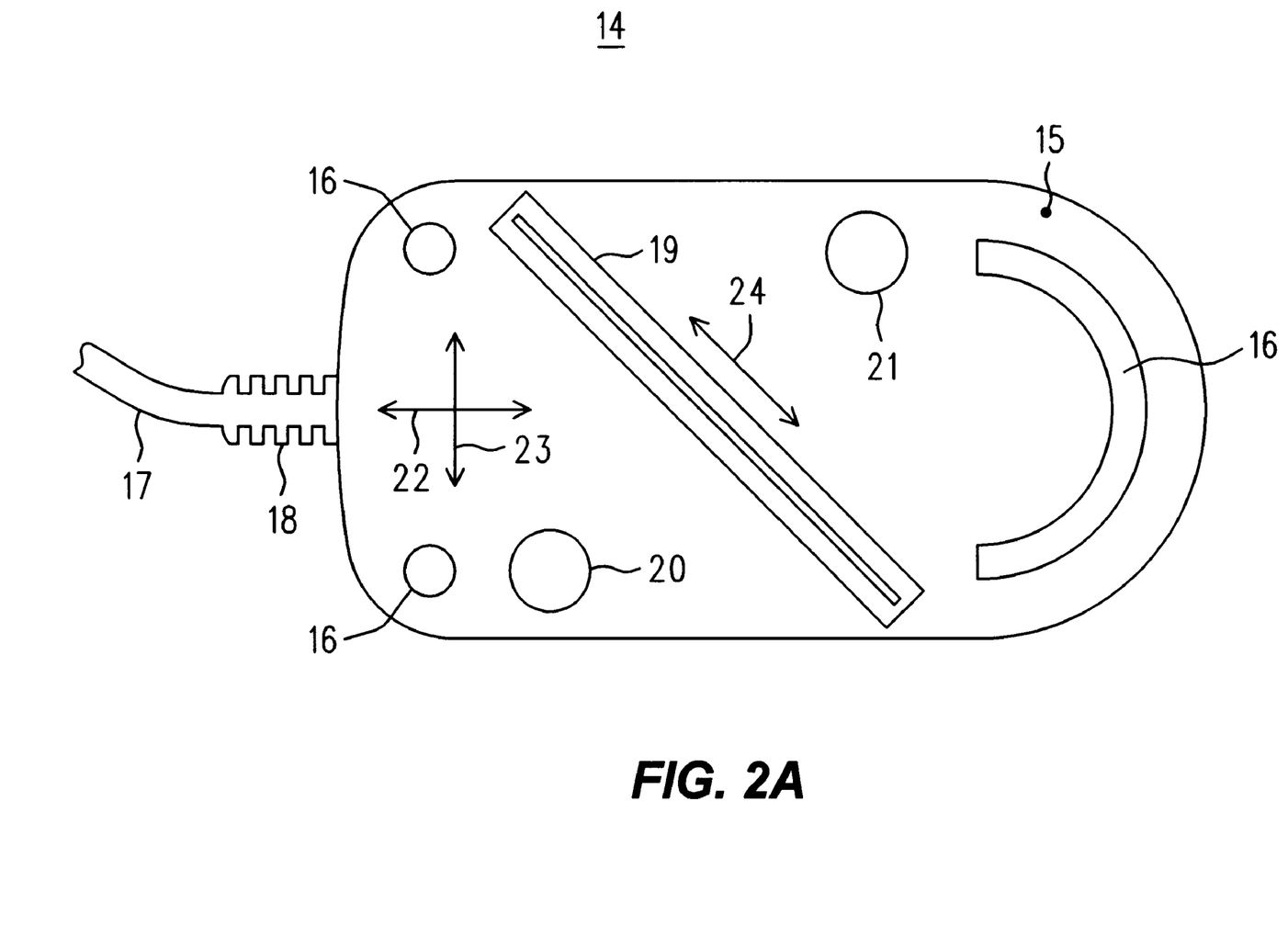
FIGS. 2A, 2B and 2C are alternate bottom views of a scanning mouse constructed in accordance with the invention.

Refer now to FIG. 2A, which is a bottom view of a scanning mouse 14 constructed in accordance with the invention. What is shown in the figure is the underside 15 of the mouse 14 (corresponds to 6 in FIG. 1), low friction glides 16 and connecting cable 17 with its strain relief 18. Of course, our scanning mouse 14 could be a cordless mouse, as well, with an optical or radio communication link to the computer. Located diagonally across the bottom of the mouse 14 and parallel to arrow 24 is a contact image sensor (CIS) 19. It might, for example, be a TSL218 from Texas Instruments of Dallas, Tex. (This TI part is a 200 dot/inch (DPI) 512×1 linear array with buffered analog sample and hold suitable for 8 bit gray-scale applications. It is described by a six page data sheet SOES014B of August 1994 and revised in November 1995. The TSL401 is a physically shorter 128×1 400 DPI gray-scale part described by SOES011 of March 1996. Color parts . . . ) Also shown are the locations of the two navigation mechanisms, 20 and 21. In this particular example the CIS 19 has been inclined at 45° to the principal up/back and left/right axes of the mouse, represented by arrows 22 and 23, respectively. The idea is to allow scanning with the mouse 14 in along both principal axes, as well as in all other directions except that indicated by arrow 24. It is of course, a compromise, in that the effective length of the CIS is reduced by about 30% for motion in the direction of arrows 22 and 23; the full width of the CIS 19 is available only in directions at right angles to arrow 24.

Figure 2B:
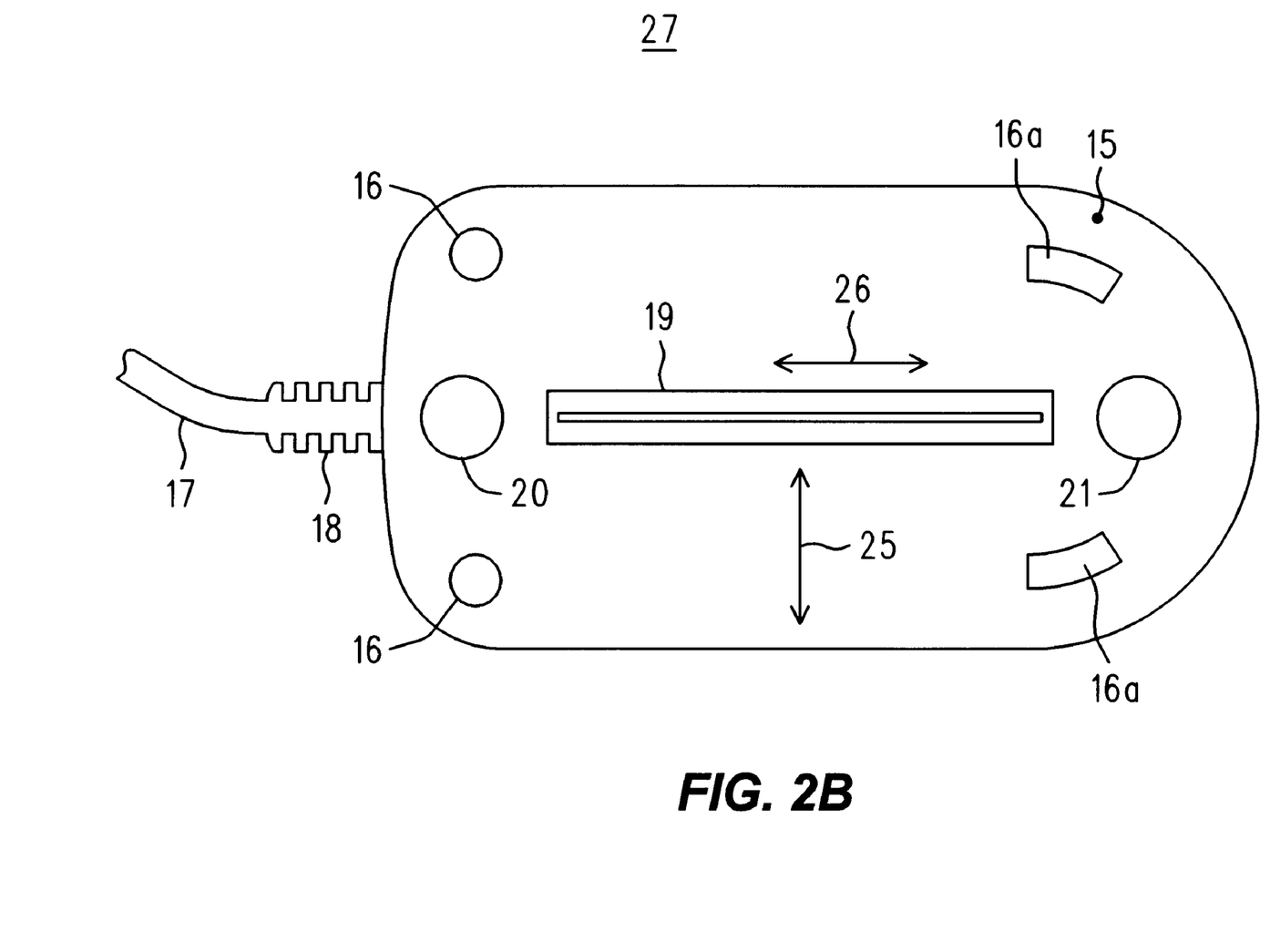

FIG. 2B is a bottom view of an alternate embodiment of a scanning mouse 27 that is also constructed in accordance with the invention. In this case the CIS 19 is situated parallel to the front/back principal axis of the mouse 27, as indicated by arrow 26. This optimizes the mouse 27 for scanning motion parallel to the direction indicated by arrow 25. Note the somewhat different locations of the navigation sensors 20 and 21.

Figure 2C:
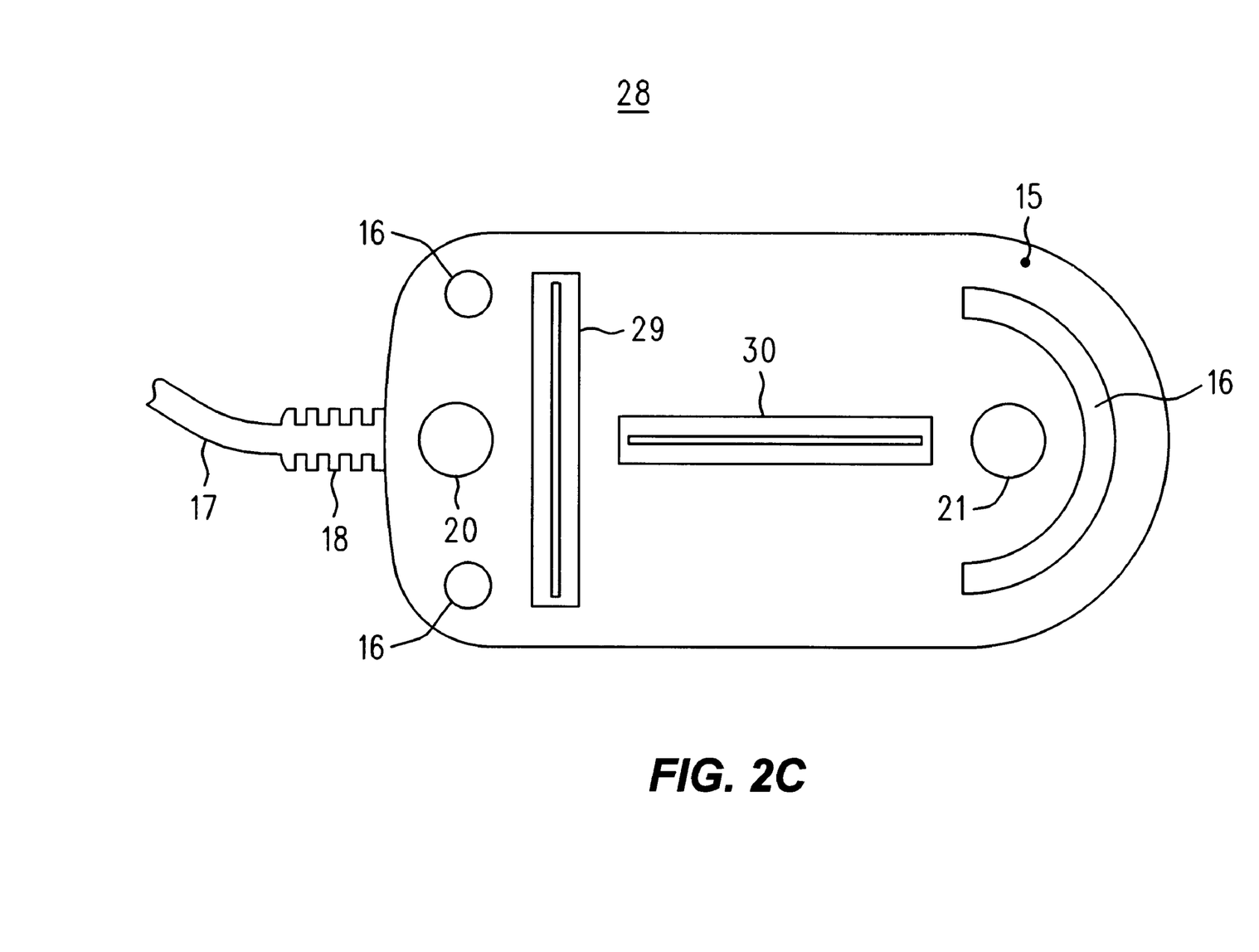

The compromise of FIGS. 2A and 2B is eliminated with the arrangement of FIG. 2C, wherein there are two orthogonal CIS's (29, 30) on the bottom of mouse 28. In this admittedly deluxe arrangement, the mouse can be used to scan in any direction. The corresponding incremental complexity in the software need not be large. Suppose that the software in the computer principally responds to the next image line, and that it is also the agency that maintains translation and rotation information. Now let image data portion of an image line come in pairs; a Y motion image data collection from image sensor 29 and an X motion image data collection from image sensor 30. Either collection would by itself would correspond to the type of situation of FIGS. 2A or 2B. All that is needed now is for the software to construe an image line as including an ordered pair of image data collections, and to further appreciate that the two image data collections are always perpendicular. Each image data collection would be translated and rotated as indicated by the data from the navigation sensors. The very first collection may be, say, assumed to represent the Y direction, with the following collection then assumed to represent X. Subsequent image collections are then translated and rotated as needed. Every other first such image collection is translated and rotated relative to it predecessor in that ordering of every other first image collection. The intervening image collections (every other second such image collection . . . ) are translated and rotated relative to their predecessors in that (every other second) ordering. The software then simply appends data from each processed image collection to the overall image being assembled, as though there were two separate image lines.

It will be appreciated that it is not necessary that the navigation sensors 20 and 21 be in line with the axis of the CIS 19; all that is required is that they have a fixed relationship thereto. It is preferred that the navigation sensors 20 and 21 be reasonably far apart, so that rotational motion of the mouse 14/27 can be more accurately determined.

Figure 3:
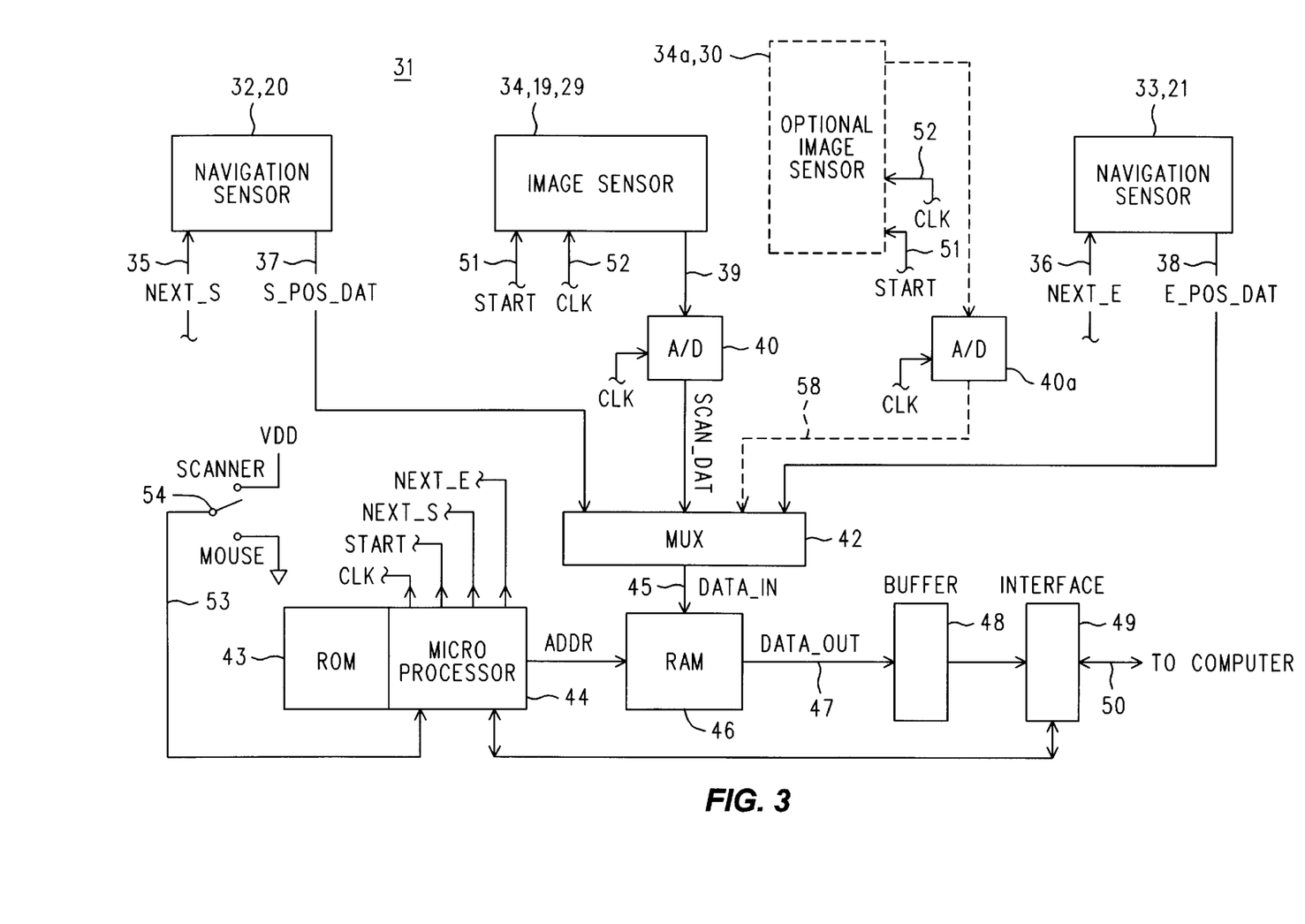
FIG. 3 is a simplified block diagram of the functional arrangement of the larger circuit elements within the scanning mouse.

Refer now to FIG. 3, which is a simplified functional block diagram 31 of the circuitry inside a scanning mouse. First, note that there are two navigation sensors 32 and 33. For the sake of simplicity we shall assume that each navigation sensor (32, 33) has a respective control signal input NEXT_S 35 and NEXT_E 36, and that upon the exertion of a signal thereon the navigation sensor (which is continuously keeping track of where it is) sends out over a position data bus (S_POS_DAT 37 and E_POS_DAT 38, respectively) the latest (X, Y) position data for its location. We shall further assume, for simplicity, that the data is either self clocking, is sent according to a clock supplied to the navigation sensor, or according to a clock provided by the navigation sensor. In any event, the idea is that we need not be too concerned about the details of this data transmission; it appears as two instances of n-many bits (one instance for X and one instance of Y) in response to the associated NEXT signal (35 or 36). For non-scanning mouse operation the number of bits n may be eight, ten, or more, depending on the internal arrangement inside the navigation sensor. This deliberate degradation would most likely be done to achieve compatibility with an existing mouse driver or other mouse related application. Some further comment here is in order.

Ones first thought may be that eight bits is not enough range to describe either the X or Y directions on the screen. True, but remember that the system is incremental, and does not deal in absolute positions, as do, say graphics tablets or other digitizers. It is sufficient to report movement since the previous report. This is how a mouse works, and requires only that there not be too much time between reports, lest there be an undetected roll-over in the value encoded by the bits. The implication, of course, is that some agency is accumulating the increments into a value that is of sufficiently many bits to completely specify the pointer position on the screen.

In the present case, the accumulation could be in the navigation sensors themselves (n is large, say, ten or twelve bits) or it could be further downstream, allowing n to be smaller. The preferred case for simple mouse mode operation is that (because the stitching software requires it) the navigation sensors have far more precision than needed for simple screen pointer control, they cut the precision down to what is needed, and do not accumulate. The position data sent during the non-scanning mode is then essentially absolute coordinate values relative to a position when some earlier reset signal occurred (not shown).

To continue then with our description of FIG. 3, note the CIS 34. It receives a START signal 51 and a CLK signal 52, in response to which it produces shifted serial analog data 39, which for a CIS is one analog signal wide (a color CCD with filters over separate collections of sensors and a white light source would produce three simultaneous analog signals). For a gray-scale CIS successive values of this signal 39 is digitized once for the entire line. For a color CIS the likelihood is that it will be digitized once during red illumination, again during green illumination, and lastly under blue illumination. In any event, the shifted serial analog data 39 is digitized by an appropriate number of analog to digital converters (A/D's) 40 to produce digital SCAN_DAT 41, the conversion being in step with a CLK signal synchronous with shifting of the serial analog data 39.

The three types of digital data, S_POS_DAT 37, SCAN_DAT 41 and E_POS_DAT 38 are all applied as inputs to a MUX 42 operating as a three-in to one-out selector operating under the control of a microprocessor 44 (if the optional image sensor 34a is present it might be 4:1). The microprocessor 44 executes code stored in a RAM 43. The output of the MUX 42 is stored in RAM 46. Under the control of the programming executed by the microprocessor 44 the data stored in the RAM 46 can at appropriate times be sent via data path 47 to a buffer 48 and thence to an interface 49 connected to a computer (not shown) by cable 50.

As drawn, the figure corresponds principally to a scanning mouse 14/27 (FIGS. 2A and 2B) having a single image sensor. In the case of a scanning mouse 28 (FIG. 2C) having two image sensors, it will be understood that the image sensor 34 shown has a first half on the left that is one of the two, and a second half on the right that is the other of the two, and that they are cascaded for control purposes but understood by the software to be the concatenation of two data sets. Another, and perhaps preferred, possibility is to treat the two a separate image sensors 34 and 34a. Sensor 34a has its own copies of the START and CLK signals, and is serviced by its own A/D converter 40a. The output 58 of that additional A/D converter 40a is applied to MUX 42 (which is now a 4:1 device), just as is the output 41 of A/D 40.

A word is in order about the functionality provided by the microprocessor 44. Its principal function is to acquire the data from the various sensors in ways that correspond to the mode of operation of the scanning mouse. It can also signal the software in the computer that scanning is occurring. To this end the scanning mouse is equipped with a switch, which could be a third mouse button 54 (button #3, as found on many a UNIX system mouse) or perhaps mechanically latching switch (push to set, push again to release). The button or switch 54 determines the value of a signal 53, which in turn specifies to the firmware of ROM 43 whether the scanning mouse 14 is operating a mouse or as a scanner. In the mouse mode, navigation data from one of the navigation sensors is placed into RAM 46 and sent to the mouse driver executing on the computer. In the mouse mode the position data from the other navigation sensor is ignored, as is the image data from the image sensor 34 (i.e., these mechanisms are simply never asked to report their data). In the mouse mode the programming stored in the ROM 43 may convert the navigation data to be sent to the mouse driver into one of the standard mouse protocols, such as IBM's PS/2 or Microsoft mouse protocol. Of course, some other mouse data protocol may be used, as well.

It will, of course, be readily appreciated that the microprocessor 44 and ROM 43 could be replaced by a suitable state machine or other logic circuitry less extensive than a microprocessor.

Here is a brief summary of what the user does to scan an image. Using the scanning mouse as a mouse, he selects an appropriate program whose internal operation is quite similar to that used by the free hand scanner to assemble an image. The main difference is that the image would appear on the screen of the computer as scanning proceeded. Once any parameters were specified (via either mouse/menu operation or with the keyboard, or both), the user places the mouse on the document to scanned and operates the switch 54. He then wipes the scanning mouse 14 back and forth as needed to scan the document, being guided as to missed spots by the image appearing on the computer's screen. Scanning the same portion of the document over again simply refreshes the image, as it were. When the scanning is complete, switch 54 is returned to its mouse position. The application can be told what to do with the image (print it, store in a file, edit it, etc.) using conventional user interface techniques.

During scanning it may be desirable to allow for some compensation of the scanned in image data owing to motion of the mouse. Present day color CIS's can produce an entire RGB scan line at 300 DPI for an 8½ inch image in well under 10 msec (as this is written the newest parts are claimed to do it in two to three milliseconds). The CIS in our scanning mouse probably will not exceed two inches in length, so that it is reasonable to expect a scan line to occur over 1 to 1½ msec. Say the mouse was moving at ten inches per second (certainly fast enough for a mouse at the end of a human arm!). The scan line took a millisecond to capture and produce. The scanning mouse would move ¹⁄₁₀₀₀ of ten inches, or 0.010 inches. At 300 DPI a pixel is 0.0033 inches, so there might arise some imaging error of a few pixels at high scanning mouse velocities and high resolutions. The imaging software can compensate, at least to the first order, for such motion, by noticing the velocities in the X and Y directions, and appropriately stretching or compressing the RGB image components (bearing in mind that for color CIS the R pixel values are not taken at the same time as the B pixel values, and that a different amount of stretching or compressing may be needed). This compensation assumes that the motion of the scanning mouse was uniform (i.e., constant velocities in X and Y), when if fact, maybe it was, but then again maybe it was not. Sensitivity of the compensation to non-uniform motion may be decreased by programming the microprocessor 44 to obtain S_POS_DAT 37 at the start of an image line, get SCAN_DAT 41 next, followed by E_POS_DAT 38. Consecutive S_POS_DAT's yield a velocity (direction and speed) for one end of the image sensor 34, while consecutive E_POS_DAT's do the same for the other end. (Remember, however, that the navigation sensors (32, 33) are not necessarily in line with the axis of the image sensor 34, nor even particularly close to its end, so that the displacements between the navigation sensors and the ends of the image sensor 34 must be accounted for first.) The idea here is that under conditions of non-uniform motion the velocities of the two ends of the image sensor 34 may be quite different (suppose the there is rotation about one end of the image sensor 34). The data ordering E_POS_DAT 37, SCAN_DAT 41, E_POS_DAT 38 obtains the velocity data for the end points of the image line closer in time to when their associated image data was taken, thereby minimizing the effects of non-uniform motion on the pixel placement algorithms that compensate correctly only for uniform motion. The advantage still obtains even if the correction algorithms correctly adjust for on-uniform motion.

Figure 4:
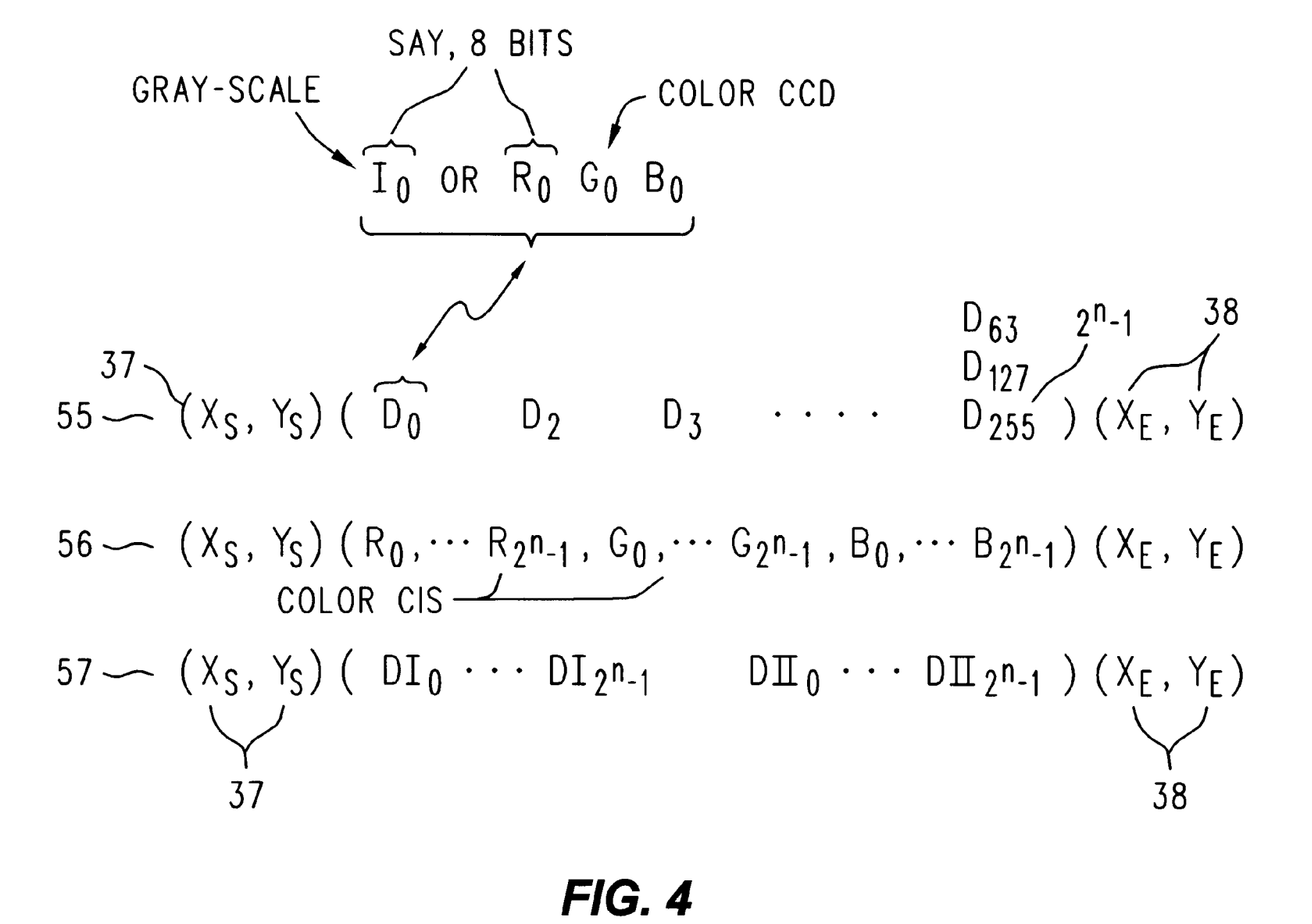
FIG. 4 is an illustration of various output formats that the scanning mouse may use to transmit scanned image data to a computer.

FIG. 4 illustrates in symbolic form various ways that an image line can be formatted for transmission from interface 49 to the computer. Each of format 55, 56 and 57 place the navigation sensor data 37 and 38 at the first and last of the image line. This is somewhat arbitrary, in that it is more important that they be measured that way (as explained above) rather than sent that way. After all, once in memory, they can be sent in just about any order. The order shown is a logical order that may help minimize the need for additional storage in the scanning mouse. The difference between the three formats is in the interior portion representing the image data. Format 55 transmits $D_0, D_1, D_2, \ldots$ that represent either single value intensity values $I_0, I_1, I_2, \ldots$ (from either a CIS or a CCD sensor) or consecutive triples of RGB values from a color CCD image sensor. In format 55 the subscripts all increment in unison. Format 56 is for a color CIS image sensor where all the R pixel values are sent in sequence, followed by and the greens, and then by all the blues. Formats 55 and 56 are for a scanning mouse 14/27 (FIGS. 2A and 2B) that has a single image sensor. Format 57 is for a scanning mouse 28 that has two image sensors (FIG. 2C). The subscripted DI terms are the scan line data for one of the two image sensors, while the DII terms are for the other. The collection of DI terms will be understood to be replaced (by substitution) by either of the scan line terms from formats 55 or 56. The same is true for the DII terms.

Some final remarks are in order. First, recall that in the Summary we indicated that the navigation must be done to a precision higher than that used to produce the scanned image, and that not all changes in navigation coordinates are grounds for taking a new image with the image sensor and then transmitting it as part of a new image line. The scanning mouse can itself predict when it has moved enough to warrant a new image line, or, it can send high resolution navigation data to the stitching software continuously, and let it tell when to make and send a new image line.

Lastly, if there are two orthogonal image sensors, as in FIG. 2C, then there are certain additional considerations. We have said that the positions of the navigation sensors relative to the ends of the image sensors need not be known, owing to the relative (incremental) manner in which the navigation sensor data is used. Unfortunately, the relationship between the two image sensors needs to known, or their data cannot be combined. The image sensors can be aligned precisely, or their particular positional relationship can be left uncontrolled but discovered and subsequently encoded either in ROM in the scanning mouse (from whence it can be retrieved by the stitching software). Alternatively, it may be stored in the stitching software and that instance of the software used only with the associated scanning mouse. The stitching software might, for example, discover the required relationship during a training session performed with a special test image supplied with the scanning mouse. The nature of the test image is known to the software, and during a training (or a confidence check or a performance verification) session, scanning that image allows discovery and subsequent saving of the needed position relationship between the two image sensors.

We claim:

1. A hand held pointing and scanning device, the device comprising:

a housing having a flat bottom surface that moves against a work surface having imageable features;

the housing also having a top surface shaped to receive a human hand and having a first axis extending generally in the direction from where the heel of the hand rests on the top surface to where the middle finger rest on the top surface, and a second axis perpendicular to the first, both axes being parallel to the bottom surface;

a first aperture in the bottom surface;

a first navigation sensor aligned with the first aperture and that produces first incremental displacement signals from imageable features on the work surface and visible through the first aperture, the first incremental displacement signals indicative of first motion in directions along the first and second axes and relative to the imageable features visible through the first aperture;

a second aperture in the bottom surface;

a second navigation sensor aligned with the second aperture and that produces second incremental displacement signals from imageable features on the work surface and visible through the second aperture, the second incremental displacement signals indicative of second motion in directions along the first and second axes and relative to the imageable features visible through the second aperture;

a third aperture in the bottom surface;

an image sensor aligned with the third aperture and that produces image data during selected times; and a formatting mechanism coupled to the first and second incremental displacement signals and to the image data and during the selected time sends a formatted version of those data to a computer and that sends the first incremental displacement data during other times.

2. A device as in claim 1 further comprising a switch activatable by a finger of the human hand and wherein the selected time is defined by a position of the switch.

3. A device as in claim 1 wherein the image sensor is a contact image sensor.

4. A device as in claim 1 wherein the first incremental displacement signals are produced at the start of producing the image data and the second incremental displacement signals are produced at the conclusion of producing the image data.

5. A device as in claim 1 wherein the image sensor is a color image sensor.

* * * * *